US008442662B2

(12) United States Patent
Niki et al.

(10) Patent No.: US 8,442,662 B2
(45) Date of Patent: May 14, 2013

(54) MEASUREMENT PARAMETER INPUT CONTROL DEVICE AND MEASUREMENT PARAMETER INPUT CONTROL METHOD

(75) Inventors: Yohei Niki, Atsugi (JP); Eiji Takeda, Atsugi (JP); Tadanori Nishikobara, Atsugi (JP); Keita Masuhara, Atsugi (JP); Takashi Murakami, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 342 days.

(21) Appl. No.: 13/021,949

(22) Filed: Feb. 7, 2011

(65) Prior Publication Data
US 2011/0196515 A1    Aug. 11, 2011

(30) Foreign Application Priority Data

Feb. 8, 2010    (JP) ................................. 2010-025735

(51) Int. Cl.
*G05B 15/00*    (2006.01)
(52) U.S. Cl.
USPC ............................................................ 700/83
(58) Field of Classification Search ...................... 700/83
See application file for complete search history.

(56) References Cited

U.S. PATENT DOCUMENTS

| 5,012,667 | A  | * | 5/1991 | Kruse ............................. 73/1.34 |
| 5,655,110 | A  | * | 8/1997 | Krivokapic et al. ............ 700/95 |
| 7,004,289 | B2 | * | 2/2006 | Shrum et al. .................. 187/393 |
| 2006/0158423 | A1 | * | 7/2006 | Kern et al. ..................... 345/156 |
| 2010/0100199 | A1 | * | 4/2010 | Ruck .............................. 700/12 |
| 2010/0141775 | A1 | * | 6/2010 | Vogel ............................. 348/187 |
| 2012/0191362 | A1 | * | 7/2012 | Schmitt et al. .................. 702/19 |
| 2012/0222464 | A1 | * | 9/2012 | Ko et al. ......................... 73/1.01 |
| 2012/0236290 | A1 | * | 9/2012 | Eisele et al. ...................... 356/6 |

FOREIGN PATENT DOCUMENTS

| EP | 1905292 A2 | * | 4/2008 |
| JP | 2002-365092 | * | 12/2002 |
| JP | 2002365092 A |  | 12/2002 |

* cited by examiner

*Primary Examiner* — Mohammad Ali
*Assistant Examiner* — Sivalingam Sivanesan
(74) *Attorney, Agent, or Firm* — Pearne & Gordon LLP

(57) ABSTRACT

A measurement parameter input control method and a measurement parameter input control device are provided which can intuitively change measurement parameters, which are set for a target device and are necessary for various measuring processes, with high operability. The measurement parameter input control device includes: a parameter processing section that acquires measurement parameter information including measurement parameters from a target device and that rewrites changed parameters which are measurement parameters after the changing to the target device; a parameter identifying section that identifies the types of the parameters in the acquired measurement parameter information and outputs soft key constructing information for constructing a parameter setting soft key based on the identified measurement parameter information, a display control section that includes a soft key controller displaying and controlling the parameter setting soft key based on the measurement parameter information on a display screen of a display unit on the basis of the soft key constructing information from the parameter identifying section; and an input unit that operates the parameter setting soft key displayed on the display unit.

3 Claims, 6 Drawing Sheets

MEASUREMENT PARAMETER INPUT CONTROL DEVICE AND MEASUREMENT PARAMETER INPUT CONTROL METHOD

BACKGROUND

1. Field of the Invention

The present invention relates to a measurement parameter input control device and a measurement parameter input control method which can intuitively change measurement parameters, which are set for a target device and are necessary for various measuring processes, with high operability.

2. Description of the Related Art

When the capabilities of various devices mounted on a data communication system or a mobile communication system or the capabilities of signals transmitted in digital circuits or networks are measured using various devices such as a pulse pattern generator, an error detector, and a spectrum analyzer, it is necessary to set parameters for each device used. A known apparatus setting the parameters necessary for the measuring process for each measuring item is disclosed, for example, in Japanese Patent Publication No. 2002-365092.

As shown in FIG. 5, a measuring device 100 disclosed in Japanese Patent Publication No. 2002-365092 includes a measurement unit 101 that measures a measurement target on the basis of pre-set parameters and outputs the measurement result, an operation unit 102 that includes a mouse 102a as a pointing device, various operation keys 102b including ten keys or up-down keys, special keys 103a to 103b, a display unit 104 that displays various pictures, and a control unit 108 that includes parameter setting means 105 for setting the parameters for the measurement unit 101, analysis means 106 for analyzing the measurement result of the measurement unit 101, and display control means 107 for selectively displaying one of plural pictures such as a setting picture for setting parameters, a measurement result picture for displaying the measurement result, and an analysis result picture for displaying the analysis result on the display unit 104.

In addition to the used applications, such a type of apparatus often individually has plural functions (such as a frequency setting function, a voltage level setting function, an attenuator setting function, and a figure alone setting function) of inputting numerical values for parameters (such as Bit Rate, Frequency, Amplitude, Threshold, Offset, and Attenuator). The parameters have specific setting information (such as upper and lower limits, units, and value ranges) or detailed information (positions of decimal points, resolutions of increment/decrement, default values of parameters, current values of parameters, and specific parameter units).

When the parameters are set for the apparatus, parameters for a measuring process or a startup process exist for each device to be used and thus methods of inputting parameter values or parameter-specific setting information and detailed information are often different depending on the parameter items.

Accordingly, since it is difficult even for a user skilled in the apparatus to grasp the input details, such as the setting information or the detailed information for all the parameters, at the time of setting the parameters, it is necessary to confirm the setting details at the time of setting, thereby complicating the setting work. In addition, there are problems in that the measuring workability for instruments to be measured is lowered and the possibility of manual operation errors is raised.

SUMMARY

Therefore, the invention is made in consideration of the above-mentioned problems. A goal of the invention is to provide a measurement parameter input control device and a measurement parameter input control method which can intuitively change parameters to parameter details desired by a user with high operability at the time of changing measurement parameters which are necessary for various measuring processes and are set for a target device.

In order to achieve the above-mentioned goal, according to an aspect of the invention, there is provided a measurement parameter input control method of changing a plurality of measurement parameters of a target device for which the plurality of measurement parameters necessary for performing a measuring process of measuring an electrical signal are set, including: a parameter information acquiring step of acquiring measurement parameter information including the measurement parameters from the target device; a parameter information display step of displaying and controlling the acquired measurement parameter information on a display screen; a parameter information selecting step of selecting one measurement parameter from the measurement parameter information displayed on the display screen; a soft key control step of displaying and controlling one parameter setting soft key of a plurality of parameter setting soft keys prepared in advance for changing the measurement parameters on the display screen; a display switching key display step of displaying a display switching key for switching and displaying the plurality of parameter setting soft keys on the display screen; a parameter setting soft key selecting step of displaying the parameter setting soft key other than the displayed parameter setting soft key on the display screen instead of the displayed parameter setting soft key when the display switching key is pressed; and a parameter rewriting step of rewriting the measurement parameter changed by using the previously-selected parameter setting soft key to the target device.

In the measurement parameter input control method, the soft key control step may include an upper and lower limit display step of displaying and controlling an upper and lower limit display area for displaying upper and lower limits of the measurement parameters in the vicinity of a parameter display area in the plurality of parameter setting soft keys prepared in advance.

According to another aspect of the invention, there is provided a measurement parameter input control device for changing a plurality of measurement parameters of a target device for which the plurality of measurement parameters necessary for performing a measuring process of measuring an electrical signal are set, including: a parameter processing unit that acquires measurement parameter information including the measurement parameters from the target device; a display control unit that includes a measurement parameter controller displaying the acquired measurement parameter information on a display screen of a display unit and a soft key controller displaying and controlling one parameter setting soft key of a plurality of parameter setting soft keys prepared in advance for changing the measurement parameters on the display screen of the display unit; and an input unit that selects one measurement parameter from the measurement parameter information displayed on the display screen and operates the parameter setting soft key displayed on the display unit. Here, the soft key controller displays and controls a display switching key for displaying the parameter setting soft key other than the displayed parameter setting soft key instead of the displayed parameter setting soft key out of the plurality of parameter setting soft keys.

In the measurement parameter input control device, the input unit may include a rotary knob, and the soft key controller may control the display so as to change the measurement parameters displayed in the plurality of parameter setting soft keys prepared in advance by interlocking with the operation of the rotary knob.

In the measurement parameter input control device, the soft key controller may display and control an upper and lower limit display area for displaying upper and lower limits of the measurement parameters in the vicinity of a parameter display area in the plurality of parameter setting soft keys prepared in advance.

Since a first soft key and a second soft key can be freely switched to each other at a predetermined position on the display screen depending on the operation situation at the time of changing the values of the measurement parameters, it is possible to improve the operability for a user and to change the measurement parameters without deteriorating the operability even when a display area of the display screen is restricted for configurational reasons of the device.

Since the input unit includes the rotary knob interlocking with the second soft key, it is possible to confirm the operating state of the target device in real time while rapidly and continuously changing the measurement parameters.

DESCRIPTION OF EXEMPLARY EMBODIMENTS

Hereinafter, exemplary embodiments of the invention will be described in detail with reference to the accompanying drawings. The invention is not limited to the embodiments, but the invention includes other embodiments, modifications, and operating techniques which may be made by those skilled in the art.

A measurement parameter input control device according to an embodiment of the invention is directed to improving the operability for a user at the time of setting parameters, by acquiring measurement parameters specific to a device (hereinafter, referred to as "target device") for which the measurement parameters, which are parameters necessary for starting the target device or performing various measuring processes, from the target device and displaying and controlling a parameter setting soft key for setting the parameters corresponding to the acquired measurement parameters at a predetermined position on a display screen of a display unit.

Configuration

The configuration of the measurement parameter input control device according to the embodiment of the invention will be described with reference to FIGS. 1 to 4.

Configuration of Target Device

First, a target device 10 which is connected to the measurement parameter input control device 1 according to the embodiment and for which measurement parameters should be set will be described. The target device 10 is a device mainly using numerical values as the measurement parameters, such as a pulse pattern generator, an error detector, and a spectrum analyzer, of which the specific measurement parameters are changed by the use of the measurement parameter input control device 1.

Figure 1:
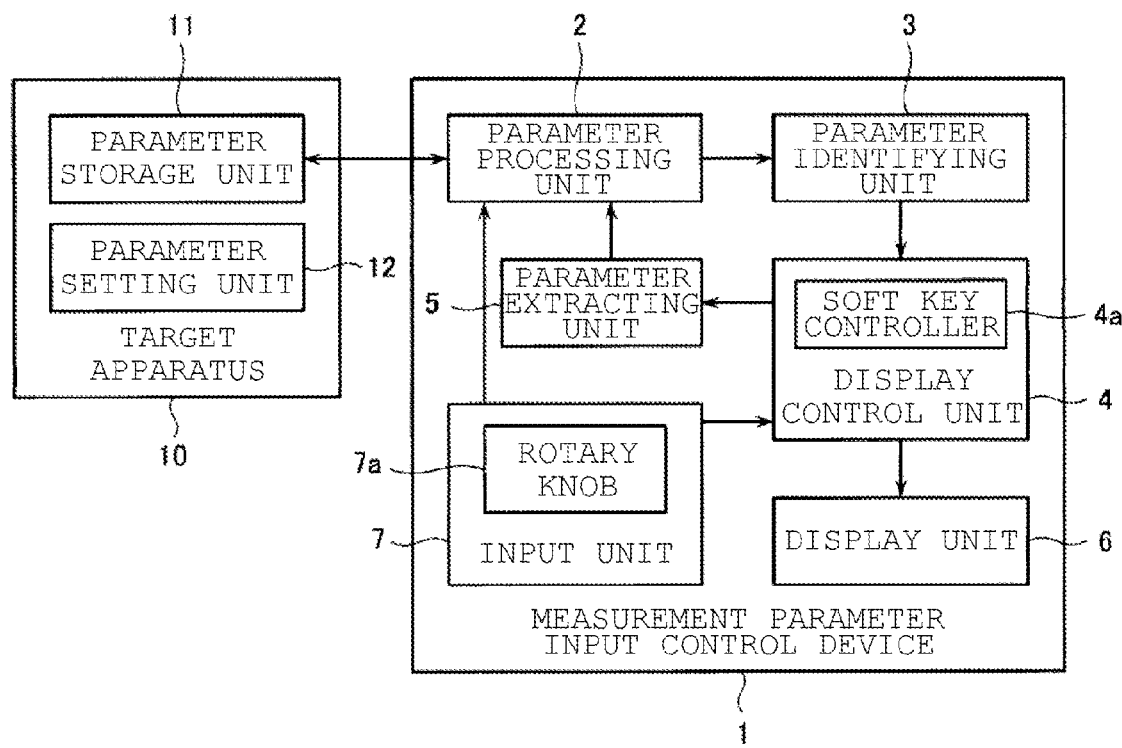
FIG. 1 is a block diagram illustrating the configuration of a measurement parameter input control device according to an embodiment of the invention.
Figure 2:
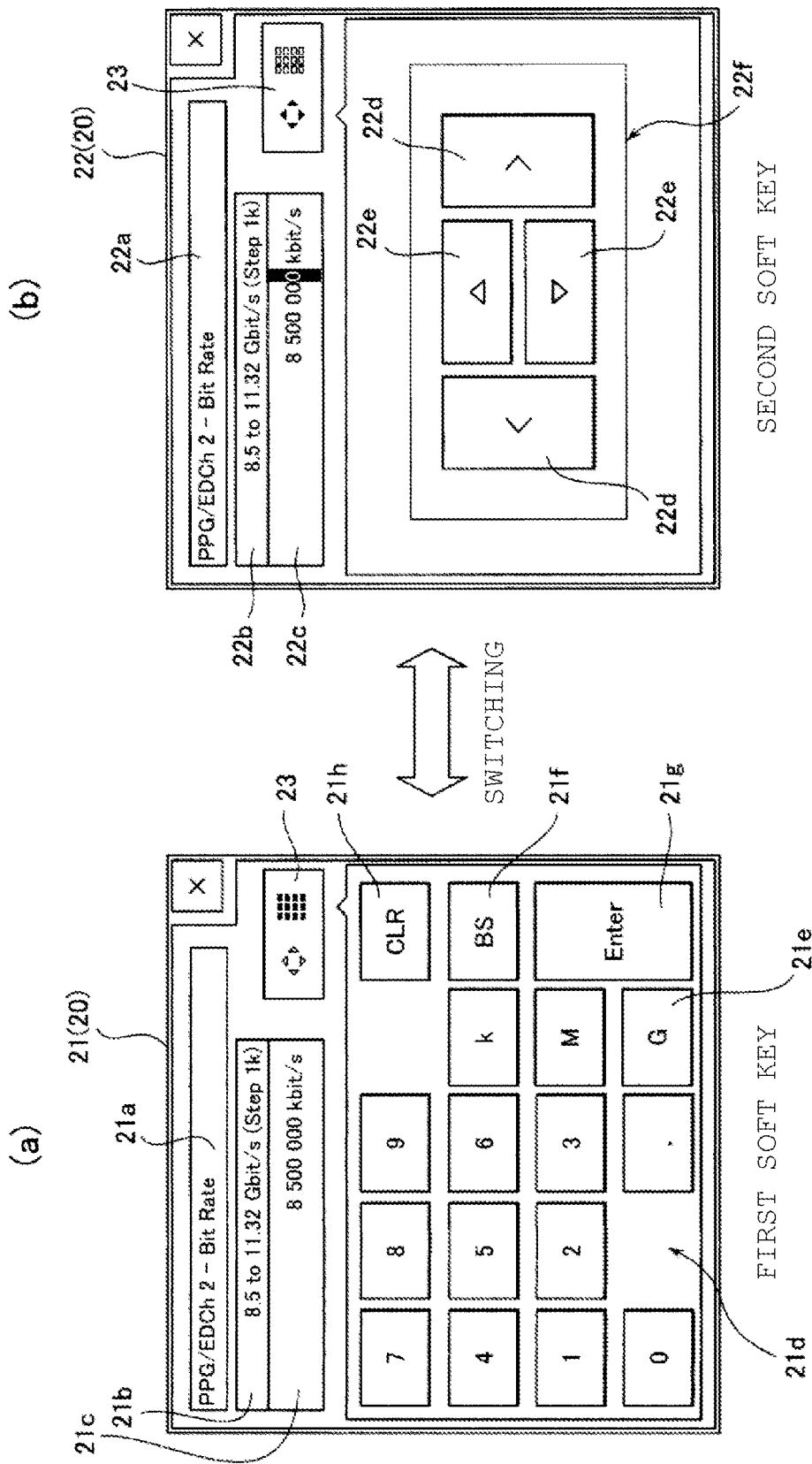
FIG. 2A is a diagram illustrating a first soft key of plural parameter setting soft keys in the measurement parameter input control device according to the embodiment of the invention and FIG. 2B is a diagram illustrating a second soft key of plural parameter setting soft keys in the measurement parameter input control device according to the embodiment of the invention.

As shown in FIG. 1, the target device 10 includes a parameter storage unit 11 and a parameter setting unit 12, and is connected to the measurement parameter input control device 1 by wires or wirelessly.

The parameter storage unit 11 stores various measurement parameters necessary for starting up constituent elements (hardware) and application software of the target device 10 and setting information (such as upper and lower limits, units, and value ranges) or detailed information (such as positions of decimal points, resolutions of increment/decrement, default values of parameters, current values of parameters, and specific parameter units) specific to the measurement parameters as measurement parameter information.

When the measurement parameter input control device 1 is operated to change the measurement parameters, the parameter storage unit 11 is subjected to a rewriting process so as to store the newest measurement parameters from the measurement parameter input control device 1 at the time of changing the details of the measurement parameters.

The parameter setting unit 12 sets the measurement parameters stored in the parameter storage unit 11 for the setting targets (hardware or application software) for which the parameters should be set. The parameter setting unit 12 normally checks whether the details of the measurement parameters stored in the parameter storage unit 11 are changed, and sets the updated measurement parameters for the target device when it is determined that the details of the parameters are changed.

Configuration of Measurement Parameter Input Control Device

The configuration of the measurement parameter input control device 1 according to the embodiment of the invention will be described with reference to FIGS. 1 to 4.

As shown in FIG. 1, the measurement parameter input control device 1 is a device changing the measurement parameters set for the target device 10, and includes a parameter processing unit 2, a parameter identifying unit 3, a display control unit 4, a parameter extracting unit 5, a display unit 6, and an input unit 7.

The parameter processing unit 2 acquires the measurement parameter information from the target device 10 having the measurement parameters to be changed on the basis of input information on the acquisition of the measurement parameters from the input unit 7, and outputs the acquired measurement parameter information to the parameter identifying unit 3. When a changed measurement parameter (hereinafter, referred to as "changed parameter") is input from the parameter extracting unit 5, the parameter processing unit 2 performs a process of rewriting the changed parameter on the parameter storage unit 11 of the target device 10 as a setting target.

The parameter identifying unit 3 identifies the details of the measurement parameter information from the parameter processing unit 2 and outputs soft key constructing information for construing a parameter setting soft key 20 corresponding to the identified measurement parameter information to the display control unit 4.

The display control unit 4 displays and controls display picture details necessary for starting up or operating the measurement parameter input control device 1 on the display unit 6 on the basis of various input information from the input unit 7. The display control unit 4 includes a soft key controller 4a constructing the parameter setting soft key 20 corresponding to the acquired measurement parameter information on the basis of the soft key constructing information from the parameter identifying unit 3.

The soft key controller 4a constructs the parameter setting soft key 20 for setting parameters depending on the acquired measurement parameter information by the use of a graphical user interface (GUI) allowing an intuitive operation on the basis of the soft key constructing information from the parameter identifying unit 3, and fixedly displays the constructed parameter setting soft key at a predetermined position (where the display position can be arbitrarily set) on a display screen of the display unit 6.

When input information based on the operation of the parameter setting soft key 20 is input from the input unit 7, the soft key controller 4a displays and controls (for example, pressing a key or changing a numerical value) the parameter setting soft key 20 so as to interlock with the input operation. When input information serving as a trigger for reflecting the changed parameter in the target device 10 is input from the input unit 7, the soft key controller 4a outputs the input information to the parameter extracting unit 5.

Here, exemplary operations until a measurement parameter is changed will be described.

Figure 3:
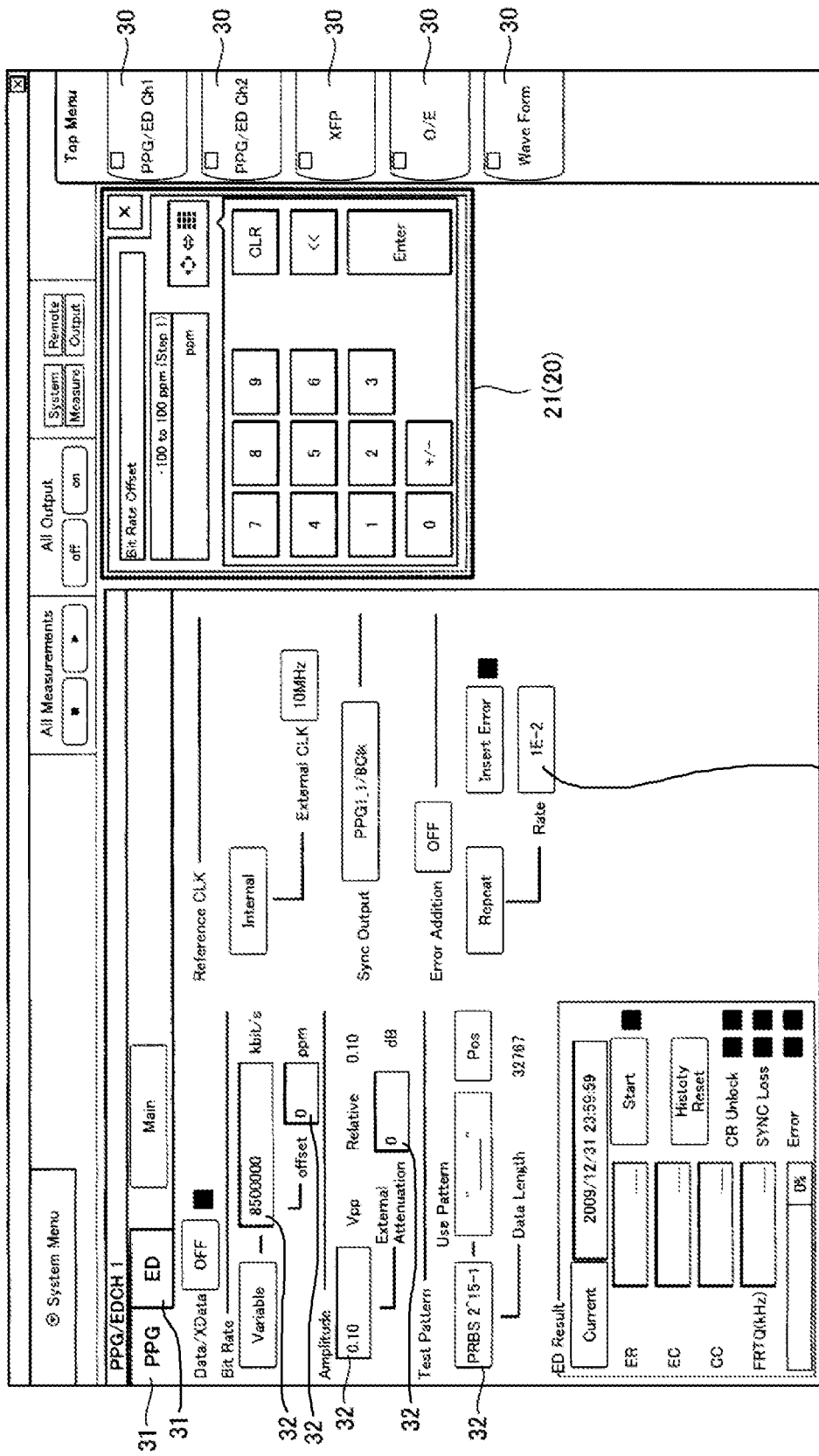
FIG. 3 is a diagram illustrating a display example of a parameter setting soft key in the measurement parameter input control device.
Figure 4:
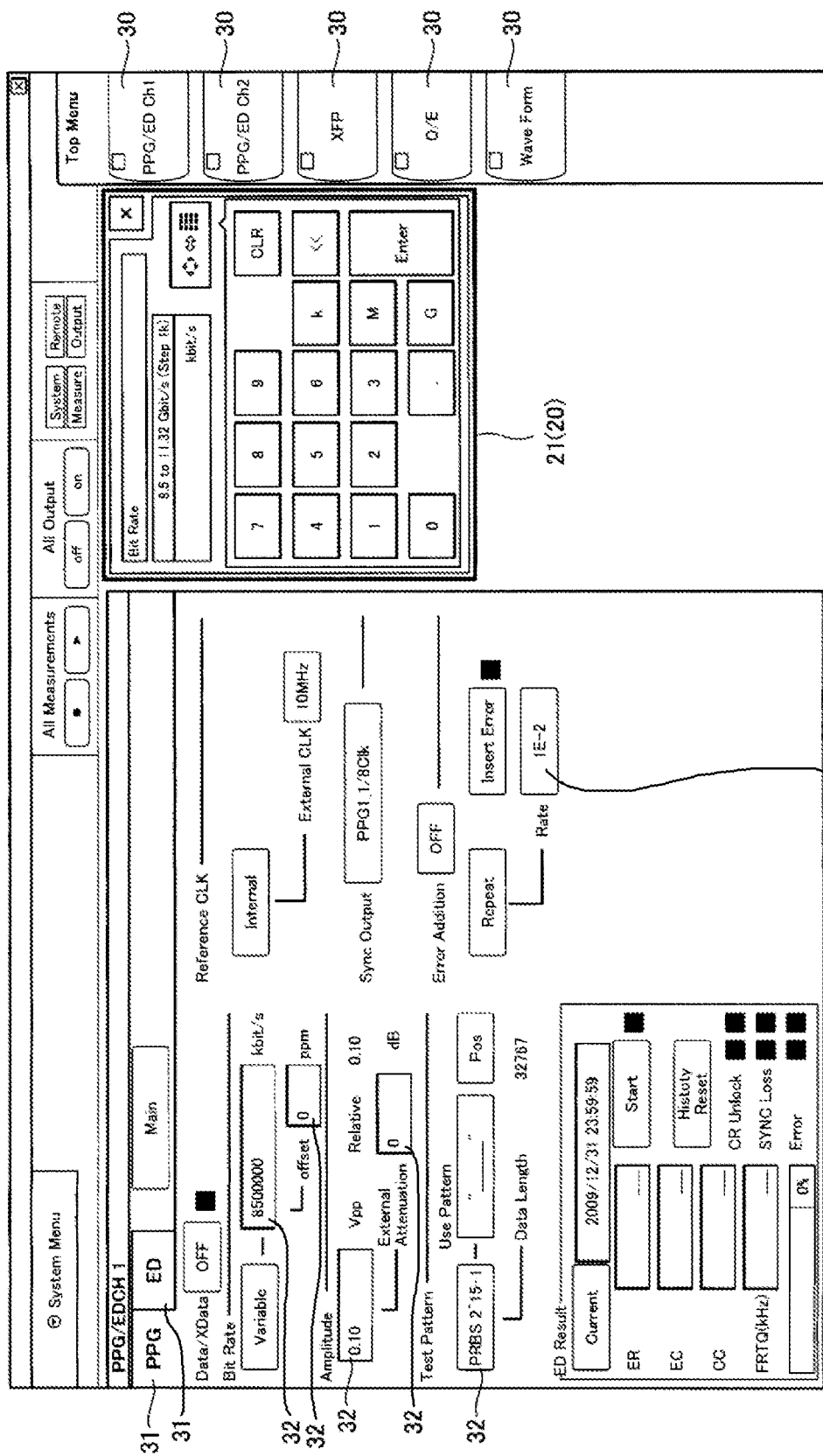
FIG. 4 is a diagram illustrating another display example of a parameter setting soft key in the measurement parameter input control device.
Figure 5:
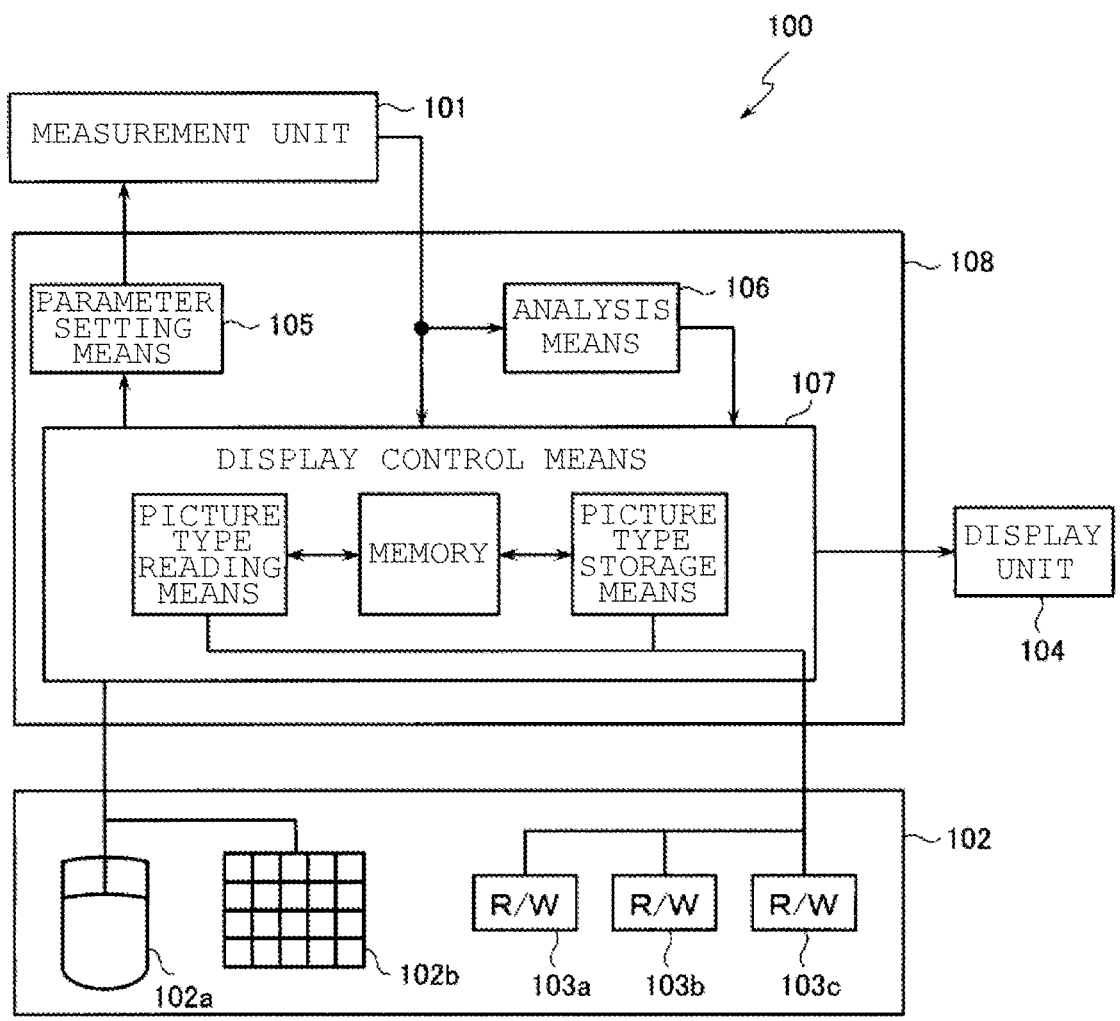
FIG. 5 is a block diagram illustrating the configuration of a measuring device setting parameters in the related art.

A measuring function including a measurement parameter, which is shown in FIG. 3 or 4, to be changed is selected using a measuring function selecting key 30.

Here, it is assumed that "PPG/ED ch1" is selected.

The measuring function selecting key 30 is selected by touching a touch panel or pointing to it with a mouse. "PPG/ED ch1" is a measuring function used to activate a pulse pattern generator and an error detector and to measure an error rate of a target.

Then, a measuring device of which a measurement parameter will be changed is selected using a device selecting tab 31.

In FIG. 3 or 4, for example, tabs of the pulse pattern generator (PPG) and the error detector (ED) are displayed as the measuring devices to be changed.

The device selecting tab 31 is selected by touching a touch panel or pointing to it with a mouse.

A measurement parameter 30 to be changed is then selected. Here, it is assumed that the numerical part of "Bit Rate" is selected.

The measurement parameter 30 is selected by touching a touch panel or pointing to it with a mouse.

For example, when the numerical part of "Bit Rate" is selected, the parameter setting soft key 20 is displayed on the display screen by pop-up, as shown in FIGS. 3 and 4.

Here, the parameter setting soft key 20 displayed and controlled by the soft key controller 4a will be described with reference to FIGS. 2A and 2B. In the following example, the parameter setting soft key 20 is operated to change a measurement parameter "Bit Rate" of a pulse pattern generator.

As shown in the drawings, the parameter setting soft key 20 includes a first soft key 21 having ten keys 21d displayed therein and a second soft key 22 having up, down, right, and left cursor keys 22f displayed therein. The first soft key and the second soft key can be switched to each other by causing a user to operate a display switching key 23 disposed at a predetermined position of the soft keys 21 and 22.

As shown in FIG. 2A, the first soft key 21 is a key to be operated when a user directly inputs a value of a measurement parameter. The display area of the first soft key 21 includes a parameter name display area 21a displaying a name of a measurement parameter, an upper and lower limit display area 21b displaying upper and lower limits of the measurement parameter, and a parameter display area 21c displaying the measurement parameter. The operation keys of the first soft key 21 include ten keys 21d for inputting numerical values of the measurement parameter, a unit changing key 21e for changing the unit of the measurement parameter, a backspace (BS) key 21f for deleting the previous numerical value, an Enter key 21g for determining an input numerical value, a clear key 21h for deleting the numerical value of the parameter display area 21c, and a display switching key 23 for switching the display to the second soft key 22.

The changed parameter changed by the first soft key 21 is extracted by the parameter extracting unit 5 by operating the Enter key 21g after changing the measurement parameter, and the extracted changed parameter is reflected in the target device 10.

As shown in FIG. 2B, the second soft key 22 is a key to be operated when a user changes the value of the measurement parameter once or continuously or when the numerical values of digits are finely adjusted. The display area of the second soft key 22 includes a parameter name display area 22a displaying a name of a measurement parameter, an upper and lower limit display area 22b displaying upper and lower limits of the measurement parameter, and a parameter display area 22c displaying the measurement parameter. The operation keys of the second soft key 22 include right and left keys 22d for moving a caret displayed in the parameter display area 22c, a cursor key 22f including up and down keys 22e raising or lowering the numerical value of the moved caret, and a display switching key 23 for switching the display to the first soft key 21.

The measurement parameter displayed in the parameter display area 22c of the second soft key 22 is configured to interlock with the operation amount of a rotary knob 7a of the input unit 7 to be described later and the numerical value in the display area is changed by interlocking with the operation amount of the rotary knob 7a. Accordingly, when a user changes the numerical value of the measurement parameter once or continuously, the user rotationally operates the rotary knob 7a in a predetermined direction, whereby the numerical value of the measurement parameter is continuously changed immediately.

When the changed parameter changed by the second soft key 22 is changed by the operation of the up and down keys 22e or the operation of the rotary knob 7a, the parameter extracting unit 5 extracts the changed parameter every time. The extracted changed parameter is reflected in the target device 10. Accordingly, when a parameter is changed by the use of the second soft key 22, the numerical adjustment based on the operation of the up and down keys 22e or the operation of the rotary knob 7a is reflected in the target device 10 immediately, whereby it is possible to observe the driving situation of the target device 10 with the changing of the parameter in real time.

When the input information serving as a trigger for reflecting the changed parameter in the target device 10 is input from the soft key controller 4a, the parameter extracting unit 5 extracts the current measurement parameter displayed in the parameter setting soft key 20 from the soft key controller 4a as a changed parameter and outputs the extracted parameter to the parameter processing unit 2.

In the case where the parameter extracting unit 5 extracts the parameter changed by the use of the first soft key 21, the parameter extracting unit extracts the changed parameter from the soft key controller 4a when the input information (that is, the input information based on the operation of the Enter key 21g of the first soft key 21) serving as a trigger for reflecting the changed parameter in the target device 10 is input from the soft key controller 4a.

In the case where the parameter extracting unit 5 extracts the parameter changed by the use of the second soft key 22, the parameter extracting unit extracts the changed parameter from the soft key controller 4a when the input information (that is, the input information based on the operation of the second soft key 22 or the rotary knob 7a) serving as a trigger for reflecting the changed parameter in the target device 10 is input from the soft key controller 4a.

The display unit 6 is formed of, for example, a liquid crystal display and displays display details necessary for driving the measurement parameter input control device 1 on the display screen under the control of the display control unit 4, such as the parameter setting soft key 20 depending on the measurement parameter from the target device 10 or display details corresponding to the input information from the input unit 7.

The input unit 7 includes various input devices such as operation keys of ten keys, a selection button, and the like, a pointing device of a mouse and the like, and a touch panel having a soft key on the display screen of the display unit 6. The input unit 7 is operated at the time of starting the setting of parameters or at the time of selecting and changing the measurement parameter of the target device 10, and outputs the input information based on the operation to the parameter processing unit 2 and the display control unit 4.

The input unit 7 includes a rotary knob 7a interlocking with the second soft key 22 of the parameter setting soft key 20. The rotary knob 7a is operated at the time of greatly adjusting the value of a parameter in a state where the second soft key 22 is selected and displayed.

Processes

A series of processes of displaying and controlling the parameter setting soft key 20 in the measurement parameter input control device 1 will be described.

Process of Displaying and Controlling Parameter Setting Soft Key

A user operates the input unit 7 to select a desired target device and a measurement parameter specific to the target device out of target devices 10 connected to the measurement parameter input control device 1. When the target device 10 and the parameter to be changed are selected, the input information based on the selecting operation is output to the parameter processing unit 2.

Here, the device to be changed is, for example, the pulse pattern generator (PPG) and the error detector (ED), as shown in FIGS. 3 and 4.

The measurement parameter specific to the target device includes, for example, "Bit Rate", "Bit Rate Offset", "Amplitude", and "External Attenuation" corresponding to the measurement parameters of the pulse pattern generator (PPG), as shown in FIGS. 3 and 4.

The parameter processing unit 2 acquires measurement parameter information from the target device 10 having the measurement parameter to be changed. The acquired measurement parameter information is output to the parameter identifying unit 3, the details of the acquired measurement parameter information is identified by the parameter identifying unit 3, and the soft key constructing information for constructing the parameter setting soft key 20 corresponding to the measurement parameter information is output to the display controller 4.

The display controller 4 constructs the parameter setting soft key 20 corresponding to the acquired measurement parameter information on the basis of the soft key constructing information from the parameter identifying unit 3 and fixedly displays the constructed parameter setting soft key 20 at a predetermined position on the display screen.

By this process, the parameter setting soft key 20 corresponding to the measurement parameter to be changed is displayed and controlled at a predetermined position on the display screen, as shown in FIG. 3 when "Bit Rate Offset" as the parameter is changed and as shown in FIG. 4 when "Bit Rate" as the parameter is changed.

A series of processes of operating the parameter setting soft key 20 in the measurement parameter input control device 1 will be described. Here, the process of operating the first soft key 21 and the process of operating the second soft key 22 will be described.

Process of Operating First Soft Key

A user operates the first soft key 21 displayed on the display screen of the display unit 6 by the use of the input unit 7 to changes the measurement parameter displayed in the parameter display area 21c. When the changing of the parameter is finished, the Enter key 21g in the soft key is selected to reflect the changed parameter in the target device 10.

This operation serves as a trigger for reflecting the changed parameter in the target device 10. Accordingly, the parameter extracting unit 5 extracts the changed parameter from the soft key controller 4a and outputs the extracted changed parameter to the parameter processing unit 2. The parameter processing unit 2 rewrites the changed parameter to the target device 10 as the change target. The target device 10 sets the parameter again on the basis of the rewritten parameter, whereby the changed parameter is reflected in the target device 10.

Process of Operating Second Soft Key

A user operates the second soft key displayed on the display screen of the display unit 6 by the use of the input unit 7 to change the measurement parameter displayed in the parameter display area 21c. At this time, the measurement parameter displayed in the parameter display area 22c is changed by interlocking with the operation of the up-down key 22e or the operation of the rotary knob 7a. Since the operation of changing the parameter in the second soft key 22 serves as a trigger for reflecting the changed parameter in the target device 10, the parameter extracting unit 5 extracts the changed parameter at the time of changing the parameter.

The parameter extracting unit 5 outputs the extracted changed parameter to the parameter processing unit 2. The parameter processing unit 2 rewrites the changed parameter to the target device 10 as the changing target. The target device 10 sets the parameter again on the basis of the rewritten parameter, whereby the changed parameter is reflected in the target device 10.

As described above, in the measurement parameter input control device 1, when the target device 10 of which the parameter should be changed is selected, the parameter processing unit 2 acquires the measurement parameter information from the selected target device 10. The acquired measurement parameter information is output to the parameter identifying unit 3, and the parameter identifying unit 3 identifies the details of the measurement parameter information and outputs the soft key constructing information for constructing the parameter setting soft key 20 corresponding to the measurement parameter to the display control unit 4. The display control unit 4 constructs the parameter setting soft key 20 corresponding to the acquired parameter information on the basis of the soft key constructing information from the parameter identifying unit 3, and fixedly displays the constructed parameter setting soft key 20 at a predetermined position on the display screen.

Since the parameter setting soft key 20 can freely switch the first soft key 21, to be operated at the time of directly inputting the value of a parameter, and the second soft key 22, to be operated at the time of changing the value of a parameter, to each other once or continuously by operating the display switching key 23 in the soft keys, it is possible to improve the operability for the user. Even when the display area on the display screen is restricted for configurational reasons, it is possible to change the measurement parameter without deteriorating the operability.

Figure 6:
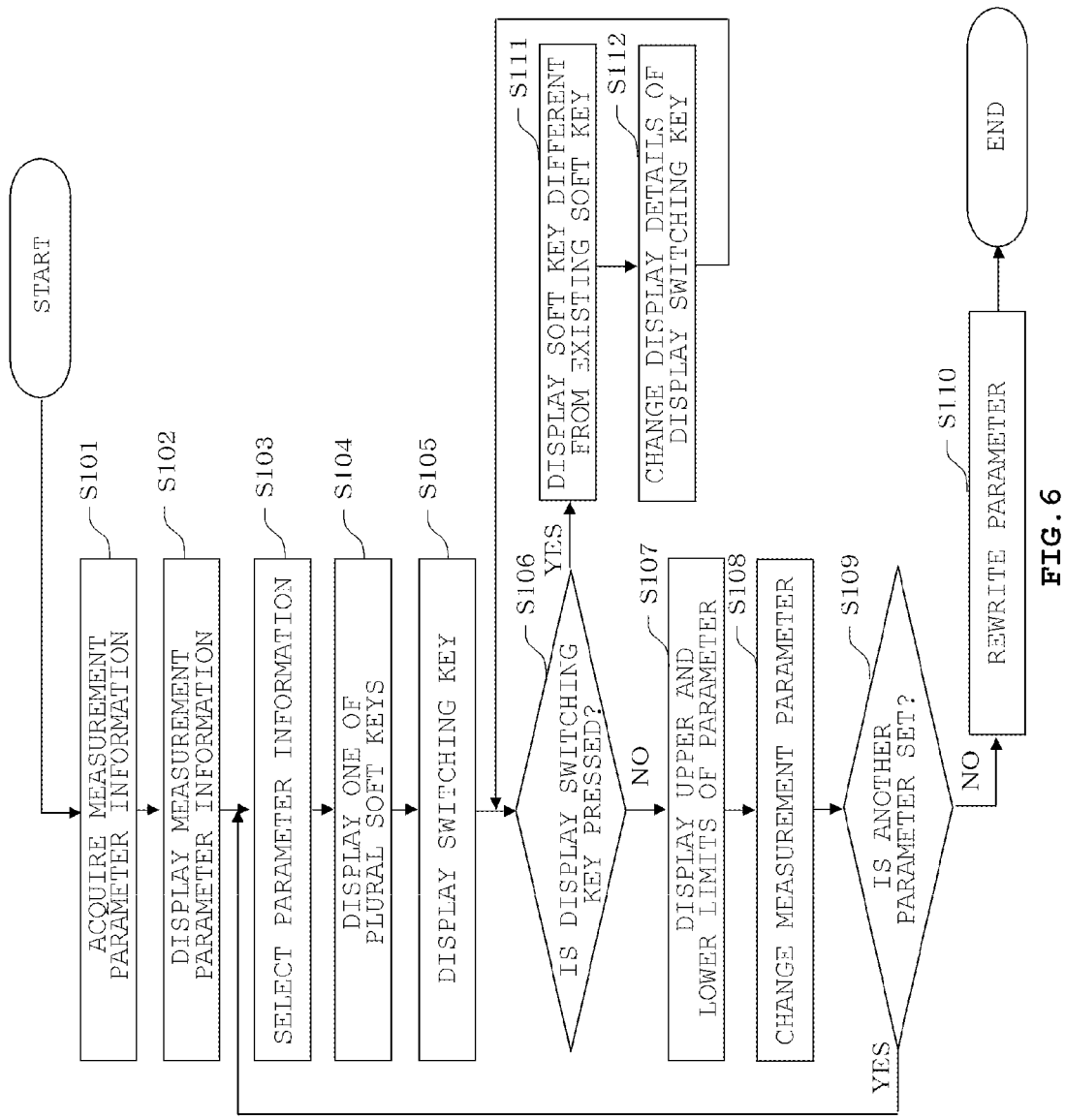
FIG. 6 is a flow diagram illustrating the process flow of a measurement parameter input control method according to an embodiment of the invention.

The software operation in the invention will be described with reference to FIG. 6.

First, the measurement parameter information including measurement parameters is acquired from the target device 10 (S101).

The acquired measurement parameter information is displayed and controlled on the display screen (S102).

One measurement parameter is selected from the measurement parameter information displayed on the display screen (S103).

One parameter setting soft key of plural parameter setting soft keys prepared in advance for changing the measurement parameters is displayed and controlled on the display screen (S104).

The display switching key for switching and displaying the plural parameter setting soft keys is displayed (S105).

When the display switching key is pressed, the parameter setting soft key other than the displayed parameter setting soft key is displayed on the display screen instead of the displayed parameter setting soft key and it is on standby to wait for pressing the display switching key (S106 and S111).

At this time, like the display switching key 23 shown in FIGS. 2A and 2B, a pattern in which the currently-activated parameter setting soft key is highlighted and a pattern in which the currently-deactivated parameter setting soft key is displayed in gray-out may be displayed on the display switching key 23 (S112).

When the parameter setting soft key is displayed and controlled on the display screen in step S104, upper and lower limit display areas 21b and 22b for displaying the upper and lower limits of the measurement parameter may be displayed and controlled in the vicinity of the parameter display areas 21c and 22c in the plural parameter setting soft keys prepared in advance (S107).

The measurement parameter is changed using the previously-selected parameter setting soft key (S108).

Here, when another measurement parameter is set, the process of step S103 of selecting one measurement parameter in the measurement parameter information displayed on the display screen may be performed again (S109).

The measurement parameter changed by using the finally-selected parameter setting soft key is rewritten to the target device 10 (S110).

Like the process of step S112, by displaying the pattern in which the currently-activated parameter setting soft key is highlighted and the pattern in which the currently-deactivated parameter setting soft key is displayed in gray-out on the display switching key 23, a user can easily recognize that it is the display switching key 23 for switching the parameter setting soft key other than the displayed parameter setting soft key.

Since the input unit 7 includes the rotary knob 7a interlocking with the second soft key 22, it is possible to follow the rapid and successive change of parameters.

Although it has been described in the above-mentioned embodiment that the measurement parameter input control device 1 and the target device 10 are individually provided and connected to each other by wires or wirelessly, the measurement parameter input control device 1 and the target device 10 may be disposed in a chassis to form a body. The number of target devices 10 connected thereto may be one or more.

Although it has been described that the parameter setting unit 12 is disposed in the target device 10, the parameter processing unit 2 of the measurement parameter input control device 1 may directly set the changed parameter for the target device 10 in a certain configuration of the target device 10.

Although it has been described that the first soft key 21 of the parameter setting soft key 20 inputs only the numerical values of the parameters, for example, a soft key capable of inputting text such as English alphabet keys used to select a folder or to input a password may be simultaneously displayed on the screen in addition to the ten keys in some configurations or types of the target device 10 to be used.

What is claimed is:

1. A measurement parameter input control method of changing a plurality of measurement parameters of a target device for which the plurality of measurement parameters necessary for performing a measuring process of measuring an electrical signal are set, comprising:

a parameter information acquiring step of acquiring measurement parameter information including the measurement parameters from the target device;

a parameter information display step of displaying and controlling the acquired measurement parameter information on a display screen;

a parameter information selecting step of selecting one measurement parameter from the measurement parameter information displayed on the display screen;

a soft key control step of displaying and controlling one parameter setting soft key of a plurality of parameter setting soft keys prepared in advance for changing the measurement parameters on the display screen;

a display switching key display step of displaying a display switching key for switching and displaying the plurality of parameter setting soft keys on the display screen;

a parameter setting soft key selecting step of displaying the parameter setting soft key other than the displayed parameter setting soft key on the display screen instead of the displayed parameter setting soft key when the display switching key is pressed; and a parameter rewriting step of rewriting the measurement parameter changed by using the previously-selected parameter setting soft key to the target device, wherein the soft key control step includes an upper and lower limit display step of displaying and controlling an upper and lower limit display area for displaying upper and lower limits of the measurement parameters in the vicinity of a parameter display area in the plurality of parameter setting soft keys prepared in advance.

2. A measurement parameter input control device for changing a plurality of measurement parameters of a target device for which the plurality of measurement parameters necessary for performing a measuring process of measuring an electrical signal are set, comprising:

a parameter processing unit that acquires measurement parameter information including the measurement parameters from the target device;

a display control unit that includes a measurement parameter controller displaying the acquired measurement parameter information on a display screen of a display unit and a soft key controller displaying and controlling one parameter setting soft key of a plurality of parameter setting soft keys prepared in advance for changing the measurement parameters on the display screen of the display unit; and an input unit that selects one measurement parameter from the measurement parameter information displayed on the display screen and operates the parameter setting soft key displayed on the display unit, wherein the soft key controller displays a display switching key for displaying the parameter setting soft key other than the displayed parameter setting soft key instead of the displayed parameter setting soft key out of the plurality of parameter setting soft keys, wherein the soft key controller displays and controls an upper and lower limit display area for displaying upper and lower limits of the measurement parameters in the vicinity of a parameter display area in the plurality of parameter setting soft keys prepared in advance.

3. The measurement parameter input control device according to claim 2, wherein the input unit includes a rotary knob, and wherein the soft key controller controls the display so as to change the measurement parameters displayed in the plurality of parameter setting soft keys prepared in advance by interlocking with the operation of the rotary knob.

* * * * *